US008130262B2

(12) United States Patent
Behm et al.

(10) Patent No.: US 8,130,262 B2
(45) Date of Patent: Mar. 6, 2012

(54) APPARATUS AND METHOD FOR ENHANCING FIELD OF VISION OF THE VISUALLY IMPAIRED

(75) Inventors: Gary W. Behm, Hopewell Junction, NY (US); Alfred J. Noll, Poughkeepsie, NY (US); Richard E. Von Mering, Pine Bush, NY (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/354,266

(22) Filed: Jan. 15, 2009

(65) Prior Publication Data

US 2010/0177179 A1     Jul. 15, 2010

(51) Int. Cl.
*H04N 9/47*     (2006.01)
(52) U.S. Cl. ............................................ 348/62; 348/53
(58) Field of Classification Search .................... 348/62, 348/63, 53, E13.036; 382/114
See application file for complete search history.

(56) References Cited

U.S. PATENT DOCUMENTS

| | | | | |
|---|---|---|---|---|
| 5,777,715 A | * | 7/1998 | Kruegle et al. | 351/158 |
| 6,611,618 B1 | * | 8/2003 | Peli | 382/154 |
| 7,280,704 B2 | * | 10/2007 | Peli | 382/260 |
| 7,573,525 B2 | * | 8/2009 | Yamasaki | 348/345 |
| 7,859,562 B2 | * | 12/2010 | Igarashi et al. | 348/61 |
| 2006/0098089 A1 | | 5/2006 | Sofer | |
| 2008/0183244 A1 | * | 7/2008 | Greenberg et al. | 607/54 |
| 2009/0306741 A1 | * | 12/2009 | Hogle et al. | 607/54 |

* cited by examiner

*Primary Examiner* — Yemane Mesfin
(74) *Attorney, Agent, or Firm* — Wenjie Li

(57) ABSTRACT

An apparatus and a method for enhancing a field of vision of a user with a visual impairment to help the user to navigate safely in the surroundings. The apparatus includes a body, at least one video device coupled to the body for recording a visual image of a physical environment surrounding the user, at least one monitor coupled to the body, a processor which receives signals from the at least one video device and operatively controls the at least one monitor to display the visual image recorded by the at least one video device, and a tunnel vision finder to determine the user's actual vision size. The method includes the step of determining the user's actual vision size, acquiring a visual image of a physical environment surrounding the user, processing the visual image, and displaying the visual image in the user's actual vision.

18 Claims, 6 Drawing Sheets

APPARATUS AND METHOD FOR ENHANCING FIELD OF VISION OF THE VISUALLY IMPAIRED

FIELD OF THE INVENTION

The present invention relates generally to an apparatus for providing surrounding environmental information to aid a visually impaired person and a method of operating the same. More particularly, the present invention is directed to an apparatus for enhancing the field of vision of a visually impaired person and a method of operating the same.

BACKGROUND OF THE INVENTION

Field of vision (FOV) is the angular extent of the observable world that can be seen at a given moment. The FOV for a person of normal vision is around 120 degrees. However, a visually impaired person can have a much contracted FOV. For example, a person with Retinitis Pigmentosa (RP) has a FOV of 20 degrees or less. Such a person is often classified as legally blind.

The American Foundation for The Blind (AFB) estimated that the legally-blind population is about 1.3 Million in the United States. As a pedestrian, a blind or visually impaired person runs a far greater risk to be involved in serious traffic accidents. Many blind or visually impaired people in the United States use mobility canes to guide them around. A conventional mobility cane, however, only provides a very limited amount of information about a user's surrounding environment, usually about the objects that may be physically touched by the cane.

Various other devices have been developed to provide a blind or visually impaired person information about his or her surrounding environment beyond the physical reach of a conventional cane. For example, an acoustic cane can provide information through sound feedback (echolocation). When an acoustic cane is used, it sends out audio signals that reflect or echo from objects within the user's surrounding environment. The user interprets the echoes to decipher the layout of the environment. Other devices send out light signals that reflect from objects surrounding the user. The reflections are then converted into audible signals such as a click or a variably pitched beep to convey information about the surrounding objects back to the user.

U.S. patent application Ser. No. 10/519,483 (Publication Number US 2006/0098089 A1) discloses an apparatus including electro-optical devices to detect and identify objects. A control unit is used to receive and process information from the devices. A vocal representation unit is then used to receive instructions from the control unit for purpose of audibly describing the objects to the user.

Devices relying on audio signals to convey information regarding surrounding environment to a user are ill suited for noisy environments such as heavily trafficked streets or for deaf-blind individuals who are incapable of hearing the audio signals. In such situations, it is desirable to have an apparatus and method to convey surrounding environment information through non-audio signals.

SUMMARY OF THE INVENTION

In one aspect, the present invention relates to an apparatus for enhancing a field of vision of a user with a visual impairment. The apparatus includes a body, at least one video device coupled to the body for recording a visual image of a physical environment surrounding the user, at least one monitor coupled to the body, a processor which receives signals from the at least one video device and operatively controls the at least one monitor to display the visual image recorded by the at least one video device, and a tunnel vision finder to determine the user's actual vision size. Such an apparatus enables the user to navigate safely in the surroundings.

It is preferred that the at least one video device has a field of vision in the range from about 100 degrees to about 160 degrees. More preferably, the at least one video device has a field of vision of about 120 degrees.

Preferably, the at least one video device includes at least one CCD camera and the at least one monitor includes at least one LCD screen. The at least one LCD screen is preferably from about 3 inches to about 7 inches long and from about 1 inch to about 3 inches wide.

The processor may further adjust the size of the visual image displayed on the at least one monitor according to the user's actual vision size determined by the tunnel vision finder.

Preferably, the apparatus is worn by the user. More preferably, the apparatus is a headset. The headset may further have adjustable legs.

The tunnel vision finder can be either an independent element or part of the processor.

The apparatus may further have one "on/off" switch coupled to the body which controls the at least one video device. It may also have one "on/off" switch coupled to the body which controls the at least one monitor. The apparatus may include a remote controller which controls the tunnel vision finder.

It is preferred that the position of the at least one monitor relative to the body is adjustable.

In another aspect, the present invention relates to a method for enhancing a field of vision of a user with a visual impairment. The method includes the step of determining the user's actual vision size, acquiring a visual image of a physical environment surrounding the user, processing the visual image, and displaying the visual image in the user's actual vision. Such a method enables the user to navigate safely in the surroundings.

The step of determining the user's actual vision size may include: creating a table of cells on a monitor in front of the user's sight and selecting at least one cell that is visible to the user.

The step of acquiring the visual image of the physical environment may include acquiring the visual image using at least one CCD camera.

The step of processing the visual image may include adjusting the size of the visual image according to the user's actual vision size.

The step of displaying the visual image may include displaying the visual image on at least one LCD screen.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

Figure 1:
FIG. 1 is an illustration of an exemplary image that a person of normal vision sees when looking at the objects depicted in the image from a certain distance.

In describing the preferred embodiments of the present invention, reference will be made herein to FIGS. 1-9 of the drawings in which like numerals refer to like features of the invention. Features of the invention are not necessarily shown to scale in the drawings.

Disclosed herein is an apparatus for enhancing the field of vision of the visually impaired and a method of operating the same. Briefly stated, a tunnel vision finder on the apparatus first finds the actual vision size of a visually impaired person. A video device captures a visual image that a person of normal vision would see. A processor processes the visual image to fit it into actual vision size of the visually impaired person. A monitor on the apparatus then plays the visual image to the visually impaired person in his/her impaired vision.

Figure 2:
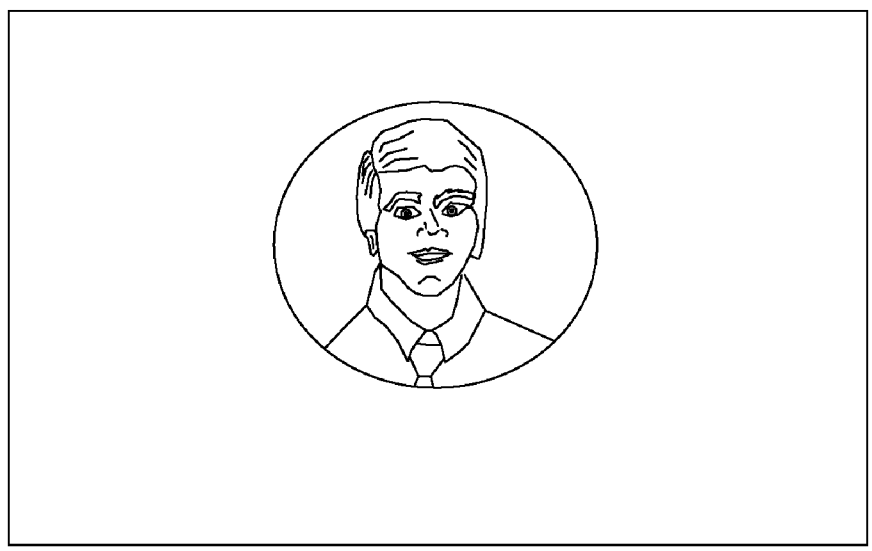
FIG. 2 is an illustration of an exemplary image that a visually impaired person sees when looking at the same objects from the same distance.
Figure 3:
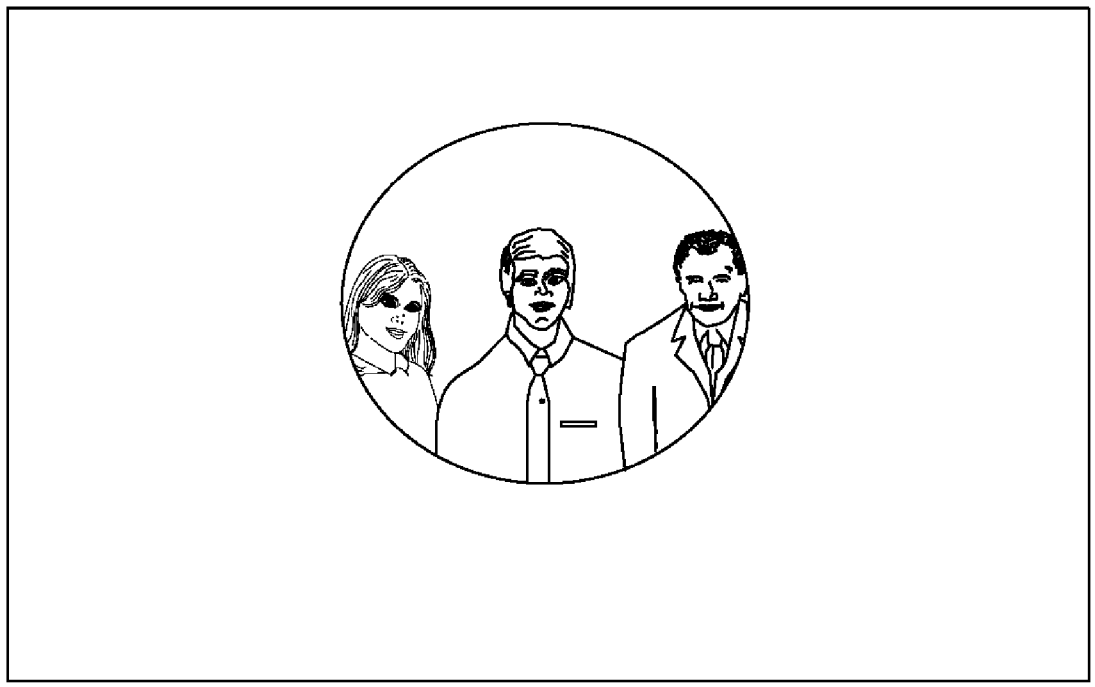
FIG. 3 is an illustration of an exemplary image that a visually impaired person sees when looking at the same objects from the same distance through an apparatus for enhancing the field of vision of the visually impaired, in accordance with one exemplary embodiment of the present invention.

Reference is now made to FIGS. 1-3. FIG. 1 is an illustration of an exemplary image that a person of normal vision sees when looking at the objects depicted in the image from a certain distance. FIG. 2 is an illustration of an exemplary image that a visually impaired person with a contracted FOV sees when looking at the same objects from the same distance. Because of the contracted FOV, the visually impaired person has a tunnel vision which losses the peripheral portion and retains the central portion of the normal vision. FIG. 3 is an illustration of an exemplary image that a visually impaired person sees when looking at the same objects from the same distance through an apparatus for enhancing the field of vision of the visually impaired, according to one embodiment of the present invention. The apparatus captures the image that a person of normal vision sees, processes it, and plays it back to the visually impaired person so that she sees what the person of normal vision sees in her tunnel vision.

Figure 4:
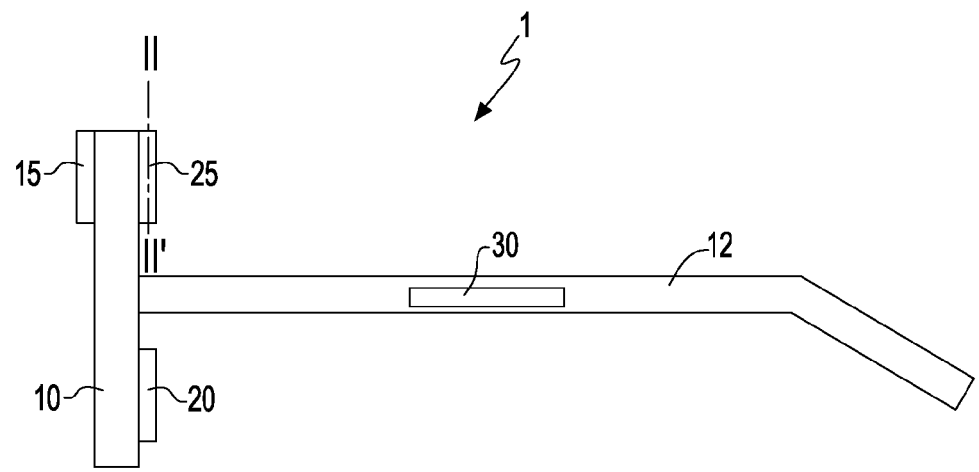
FIG. 4 is a side perspective view of an exemplary embodiment of an apparatus for enhancing field of vision of the visually impaired, in accordance with the present invention.

FIG. 4 is a side perspective view of an apparatus 1 for enhancing field of vision of the visually impaired, according to one embodiment of the present invention. Apparatus 1 is a headset which can be worn by a user. It includes a body 10, a video device 15, a monitor 20, and a control unit 25. The body 10 may include two legs 12. It is preferred that the two legs 12 are adjustable in length. The length may be adjusted through a user setting device 30 on each leg.

The video device 15 is coupled to the body 10 and is used for recording a visual image of a physical environment surrounding the user. Preferably, the video device 15 has a field of vision in the range from about 100 degrees to about 160 degrees. More preferably, the video device 15 has a field of vision of about 120 degrees, which is approximately the field of vision of a person with a normal vision. The video device 15 may be a charge-coupled device (CCD) camera. It is possible that the apparatus 1 may include more than one video device.

The monitor 20 is also coupled to the body 10 and is used for displaying the visual image recorded by the video device 15. Preferably, the monitor 20 is a liquid crystal display (LCD) screen. In one embodiment, the size of the monitor 20 is from about 3 inches to about 7 inches long and from about 1 inch to about 3 inches wide. It is possible that the apparatus 1 may include more than one monitor. The position of the monitor 20 relative to the body 10 is preferably adjustable. In other words, the monitor 20 may move along the body 10 either vertically or horizontally, or both.

Figure 5:
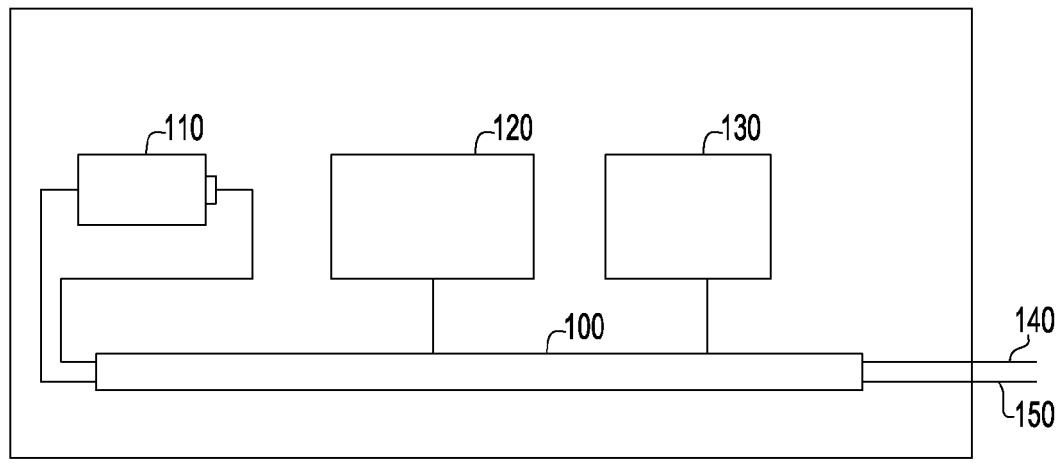
FIG. 5 is a schematic cross-sectional view of the exemplary embodiment of an apparatus taken along the line II-II' of FIG. 4.

FIG. 5 is a cross-sectional view illustrating the control unit 25 of the apparatus 1 taken along the line II-II' of FIG. 4. The control unit includes a power supply 110, a processor 120, a tunnel vision finder 130, and a circuit board 100. The circuit board 100 is electrically connected to the power supply 110, the processor 120, and the tunnel vision finder 130. The circuit board is also electrically connected to the video device 15 and the monitor 20 through lines 140 and 150. The processor 120, the tunnel vision finder 130, the video device 15, the monitor 20, and various other components are powered by the power supply 110. The power supply 110 may be a battery, a fuel cell, or various other components as commonly known in the art.

Figure 6:
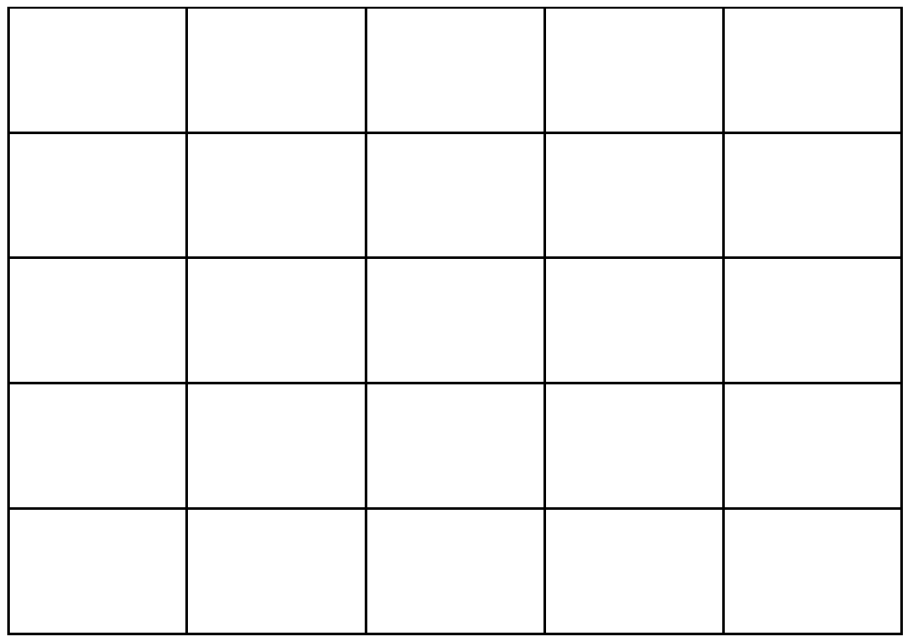
FIG. 6 is an illustration of an exemplary table of cells shown on a monitor in front of a user's sight, in accordance with one exemplary embodiment of the present invention.
Figure 7:
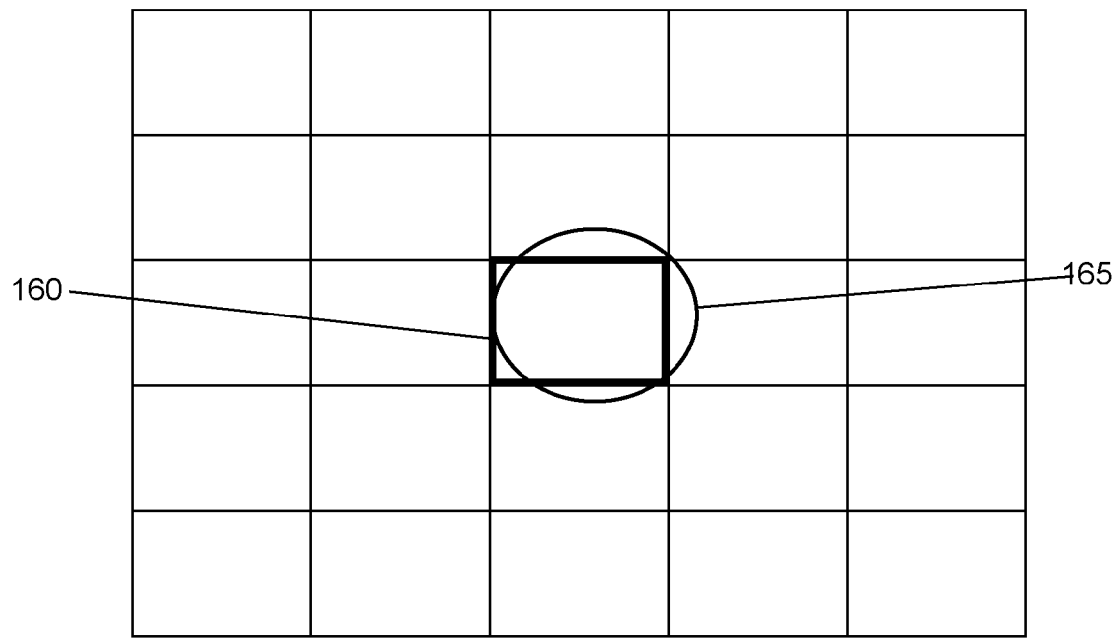
FIG. 7 is an illustration of an exemplary table of cells shown on a monitor in front of a user's sight with one cell visible to the user being selected by the user, in accordance with one exemplary embodiment of the present invention.
Figure 8:
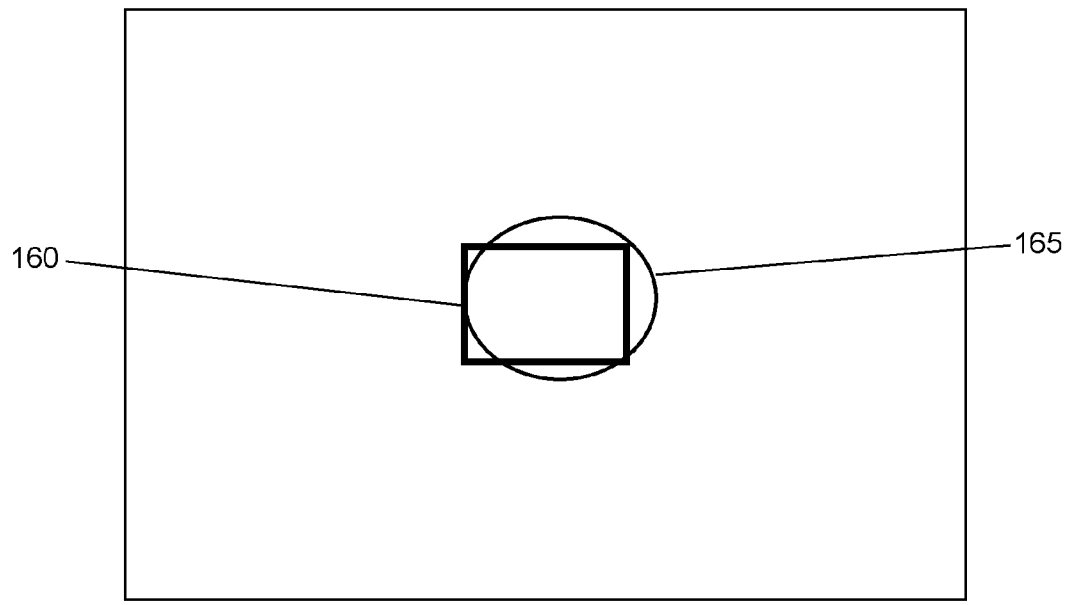
FIG. 8 is an illustration of an exemplary cell visible to a user being selected by the user, in accordance with one exemplary embodiment of the present invention.
Figure 9:
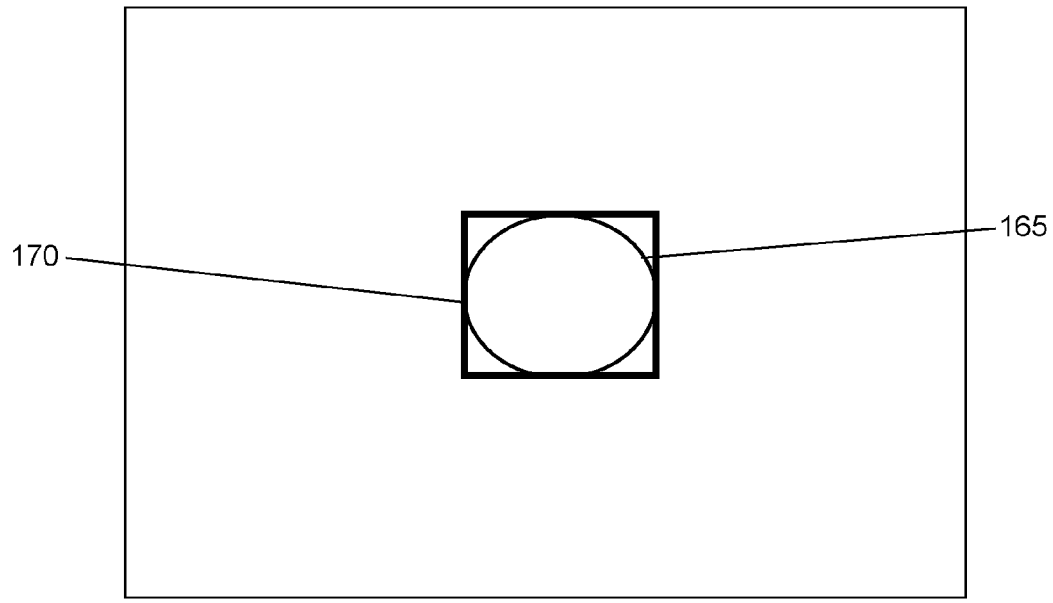
FIG. 9 is an illustration of an exemplary cell whose size and position are adjusted to better match with a user's actual vision, in accordance with one exemplary embodiment of the present invention.

The tunnel vision finder 130 is used to determine the user's actual vision size. The apparatus 1 may have a remote controller which controls the tunnel vision finder 130. The tunnel vision finder creates a table of cells on the monitor 20. The table of cells is generated by software. FIG. 6 is an illustration of an exemplary table of cells shown on the monitor 20, according to one embodiment of the present invention. This table consists of twenty-five cells. Each cell in the table is assigned location information, for example, X and Y coordinates, on the plane of the monitor screen. The user then selects the cell or cells which are visible to the user when wearing the apparatus 1. In FIG. 7, the oval shape 165 represents the user's actual vision on the monitor 20. The user selects the cell 160 which is visible to the user. The selection may be performed through the remote controller. As shown in FIG. 8, once the user makes the selection, only the cell or cells visible to the user are displayed on the monitor 20. The user may fine-tune the cell or cells selected by adjusting the size and/or the position of the cell or cells displayed on the monitor 20 to better match them with the user's actual vision. Once the fine-tuning is completed, the tunnel vision finder 130 then finds the location information corresponding to the cell or cells displayed on the monitor 20. In FIG. 9, the user adjusts the position and size of the cell 160 to better match with the oval shape 165. The adjusted cell 160 becomes the cell 170. The tunnel vision finder 130 finds the location information corresponding to the cell 170. Based on the location information, the tunnel vision finder 130 calculates the user's actual vision size and feeds the information of the user's actual vision size to the processor 120. The information of a user's actual vision size is stored in the processor 120 and can be retrieved by the user at a later time.

The processor 120 receives signals from the video device 15 and operatively controls the monitor 20 to display the visual image recorded by the video device 15. In doing so, the processor 120 adjusts the size of the visual image displayed on the monitor 20 according to the user's actual vision size as determined by the tunnel vision finder 130. According to one embodiment of the present invention, the tunnel vision finder 130 may be part of the processor 120. In other words, the processor 120 also functions as a tunnel vision finder.

The apparatus 1 may include one "on/off" switch coupled to the body 10 which controls the video device 15. The apparatus 1 may include one "on/off" switch coupled to the body 10 which controls the monitor 20.

Figure 10:
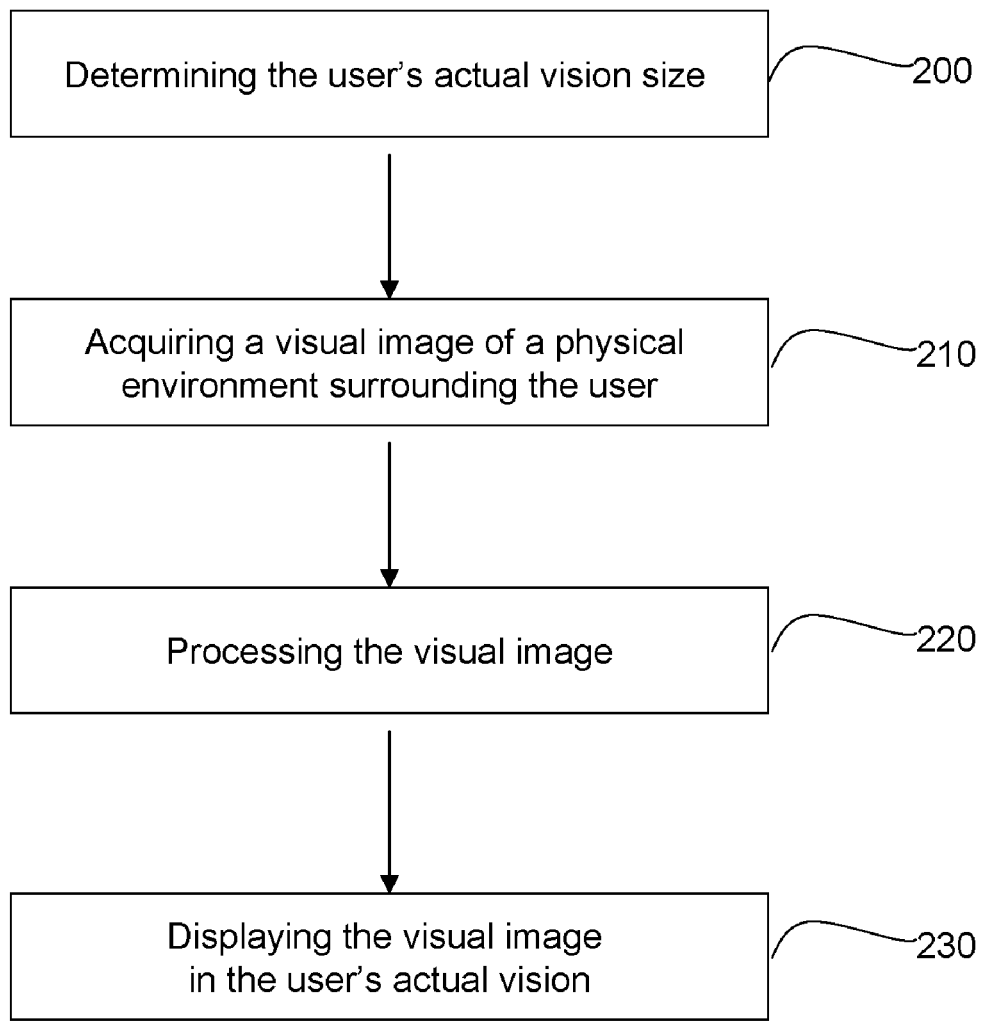
FIG. 10 is a flow chart illustrating a method for enhancing a field of vision of a user with a visual impairment, in accordance with embodiments of the present invention.

FIG. 10 is a flow chart illustrating an exemplary embodiment of a method of operating the apparatus 1. Step 200 comprises determining a user's actual vision size. As discussed above, the user's actual vision size is determined by a tunnel vision finder. The tunnel vision finder first creates a table of cells displayed on a monitor in front of the user's sight. The user then selects at least one cell that is visible to the user. The user may further fine-tune the size and/or the position of the cell selected to better match it with the user's actual vision. Based on the location information of the cell selected on the monitor, the tunnel vision finder calculates the user's actual vision size. Preferably, the location information is X and Y coordinates on the plane of the monitor screen.

Step 210 comprises acquiring a visual image of a physical environment surrounding the user. The visual image of a physical environment surrounding the user is acquired by a video device, preferably at least one CCD camera. The CCD camera preferably has a field of vision in the range from about 100 degrees to about 160 degrees, more preferably, a field of vision of about 120 degrees.

Step 220 comprises processing the visual image acquired by the video device using a processor. The processor adjusts the size of the visual image according to the user's actual vision size determined in Step 200.

Step 230 comprises displaying the visual image in the user's actual vision. Preferably, the visual image is displayed on at least one LCD screen. The size of the LCD screen is from about 3 inches to about 7 inches long and from about 1 inch to about 3 inches wide. The LCD screen is operatively controlled by the processor so that the displayed visual image is within the user's actual vision.

While the present invention has been particularly shown and described with respect to preferred embodiments, it will be understood by those skilled in the art that the foregoing and other changes in forms and details may be made without departing from the spirit and scope of the invention. It is therefore intended that the present invention not be limited to the exact forms and details described and illustrated but fall within the scope of the appended claims.

What is claimed is:

1. An apparatus for enhancing a field of vision of a user with a visual impairment comprising:
   a body;
   at least one video device coupled to the body for recording a visual image of a physical environment surrounding the user;
   at least one monitor coupled to the body;
   a processor which receives signals from the at least one video device and operatively controls the at least one monitor to display the visual image recorded by the at least one video device; and
   a tunnel vision finder to determine the size and location of the user's actual vision, wherein the processor adjusts the size of the visual image displayed on the at least one monitor according to the user's actual vision size determined by the tunnel vision finder such that the visual image is displayed within the user's actual vision.

2. The apparatus of claim 1, wherein the at least one video device has a field of vision in the range from about 100 degrees to about 160 degrees.

3. The apparatus of claim 2, wherein the at least one video device has a field of vision of about 120 degrees.

4. The apparatus of claim 1, wherein the at least one video device comprises at least one CCD camera.

5. The apparatus of claim 1, wherein the at least one monitor comprises at least one LCD screen.

6. The apparatus of claim 1, wherein the at least one LCD screen is from about 3 inches to about 7 inches long and from about 1 inch to about 3 inches wide.

7. The apparatus of claim 1, wherein the apparatus is worn by the user.

8. The apparatus of claim 7, wherein the apparatus comprises a headset.

9. The apparatus of claim 8, wherein the headset has adjustable legs.

10. The apparatus of claim 1, wherein the tunnel vision finder is part of the processor.

11. The apparatus of claim 1, further comprising one "on/off" switch coupled to the body which controls the at least one video device.

12. The apparatus of claim 1, further comprising one "on/off" switch coupled to the body which controls the at least one monitor.

13. The apparatus of claim 1, further comprising a remote controller which controls the tunnel vision finder.

14. The apparatus of claim 1, wherein the position of the at least one monitor relative to the body is adjustable.

15. A method for enhancing a field of vision of a user with a visual impairment comprising:
   determining the size and location of the user's actual vision;
   acquiring a visual image of a physical environment surrounding the user;
   processing the visual image by adjusting the size of the visual image according to the user's actual vision size; and
   displaying the visual image within the user's actual vision.

16. The method of claim 15, wherein the determining the user's actual vision size comprises:
   creating a table of cells on a monitor in front of the user's sight; and
   selecting at least one cell that is visible to the user.

17. The method of claim 15, wherein the acquiring the visual image of the physical environment comprises acquiring the visual image using at least one CCD camera.

18. The method of claim 15, wherein the displaying the visual image comprises displaying the visual image on at least one LCD screen.

* * * * *